United States Patent
Tsirkin et al.

(10) Patent No.: US 9,329,880 B2
(45) Date of Patent: May 3, 2016

(54) COUNTER FOR FAST INTERRUPT REGISTER ACCESS IN HYPERVISORS

(71) Applicant: Red Hat Israel, Ltd., Raanana (IL)

(72) Inventors: Michael Tsirkin, Yokneam Yillit (IL); Ronen Hod, Shoham (IL)

(73) Assignee: Red Hat Israel, Ltd., Raanana (IL)

( * ) Notice: Subject to any disclaimer, the term of this patent is extended or adjusted under 35 U.S.C. 154(b) by 256 days.

(21) Appl. No.: 13/766,255

(22) Filed: Feb. 13, 2013

(65) Prior Publication Data
US 2014/0229938 A1    Aug. 14, 2014

(51) Int. Cl.
| | |
|---|---|
| G06F 9/455 | (2006.01) |
| G06F 9/48 | (2006.01) |
| G06F 13/24 | (2006.01) |
| G06F 13/26 | (2006.01) |
| G06F 13/32 | (2006.01) |

(52) U.S. Cl.
CPC ............ *G06F 9/45533* (2013.01); *G06F 9/455* (2013.01); *G06F 9/45558* (2013.01); *G06F 9/48* (2013.01); *G06F 9/4812* (2013.01); *G06F 13/24* (2013.01); *G06F 13/26* (2013.01); *G06F 13/32* (2013.01); *G06F 2009/45579* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 6,378,023 B1 | 4/2002 | Christie et al. | |
| 7,209,994 B1 * | 4/2007 | Klaiber et al. | 710/264 |
| 2002/0042856 A1 * | 4/2002 | Hartwell et al. | 710/263 |
| 2003/0046464 A1 * | 3/2003 | Murty et al. | 710/260 |
| 2005/0154813 A1 * | 7/2005 | DeWitt et al. | 710/260 |
| 2006/0136653 A1 * | 6/2006 | Traut et al. | 711/6 |
| 2008/0040721 A1 * | 2/2008 | Wang et al. | 718/104 |
| 2008/0046700 A1 * | 2/2008 | Gara et al. | 712/227 |
| 2009/0328035 A1 | 12/2009 | Ganguly | |
| 2010/0023666 A1 | 1/2010 | Mansell et al. | |
| 2011/0072426 A1 * | 3/2011 | Huang et al. | 718/1 |
| 2011/0197003 A1 | 8/2011 | Serebrin et al. | |
| 2013/0047157 A1 | 2/2013 | Suzuki | |
| 2013/0159579 A1 | 6/2013 | Neiger et al. | |
| 2013/0219389 A1 * | 8/2013 | Serebrin et al. | 718/1 |
| 2014/0223060 A1 | 8/2014 | Tsirkin et al. | |
| 2014/0229648 A1 * | 8/2014 | Tsirkin et al. | 710/269 |

OTHER PUBLICATIONS

Nakajima, Jun, Intel Corporation, "Reviewing Unused and New Features for Interrupt/APIC Virtualization", 10 pages, May 2012.
Non-Final Rejection mailed Dec. 19, 2015 for U.S. Appl. No. 13/766,264.
Final Rejection mailed May 19, 2015 for U.S. Appl. No. 13/766,264.
Non-Final Rejection mailed Nov. 4, 2015 for U.S. Appl. No. 13/766,264.

* cited by examiner

*Primary Examiner* — Charles Swift
(74) *Attorney, Agent, or Firm* — Lowenstein Sandler LLP

(57) ABSTRACT

Methods, systems and computer program products for fast interrupt register access in hypervisors are provided. A computer-implemented method may include maintaining a counter associated with a register to track set interrupt vectors in a virtual machine, updating the counter in response to an interrupt event in the virtual machine, and examining the counter to determine when an interrupt vector is set.

17 Claims, 6 Drawing Sheets

COUNTER FOR FAST INTERRUPT REGISTER ACCESS IN HYPERVISORS

TECHNICAL FIELD

Examples of the present disclosure generally relate to virtual machines, and more specifically, relate to interrupt handling in virtual machines.

BACKGROUND

An interrupt is a signal sent to a central processing unit (CPU) to inform the CPU of an event for immediate attention. An interrupt controller is a device responsible for delivering an interrupt to a CPU. An interrupt controller also may send interrupt handler information to a CPU. Interrupt handler information may include a memory address where an interrupt service routine is stored.

A CPU halts instruction processing and stores the existing execution state when an interrupt occurs. The CPU may then begin executing instructions of an interrupt service routine located at a specific memory address. On completion, the CPU may restore the previously saved execution state and resume instruction processing at the point where the interrupt occurred.

A virtual machine is a software-based emulation of a physical computing environment that includes its own virtual resources (e.g., CPU, RAM, disk storage, network connectivity, etc.). Virtual machines can simulate interrupts and interrupt processing to mimic operations that occur on a physical computing system.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Figure 1:
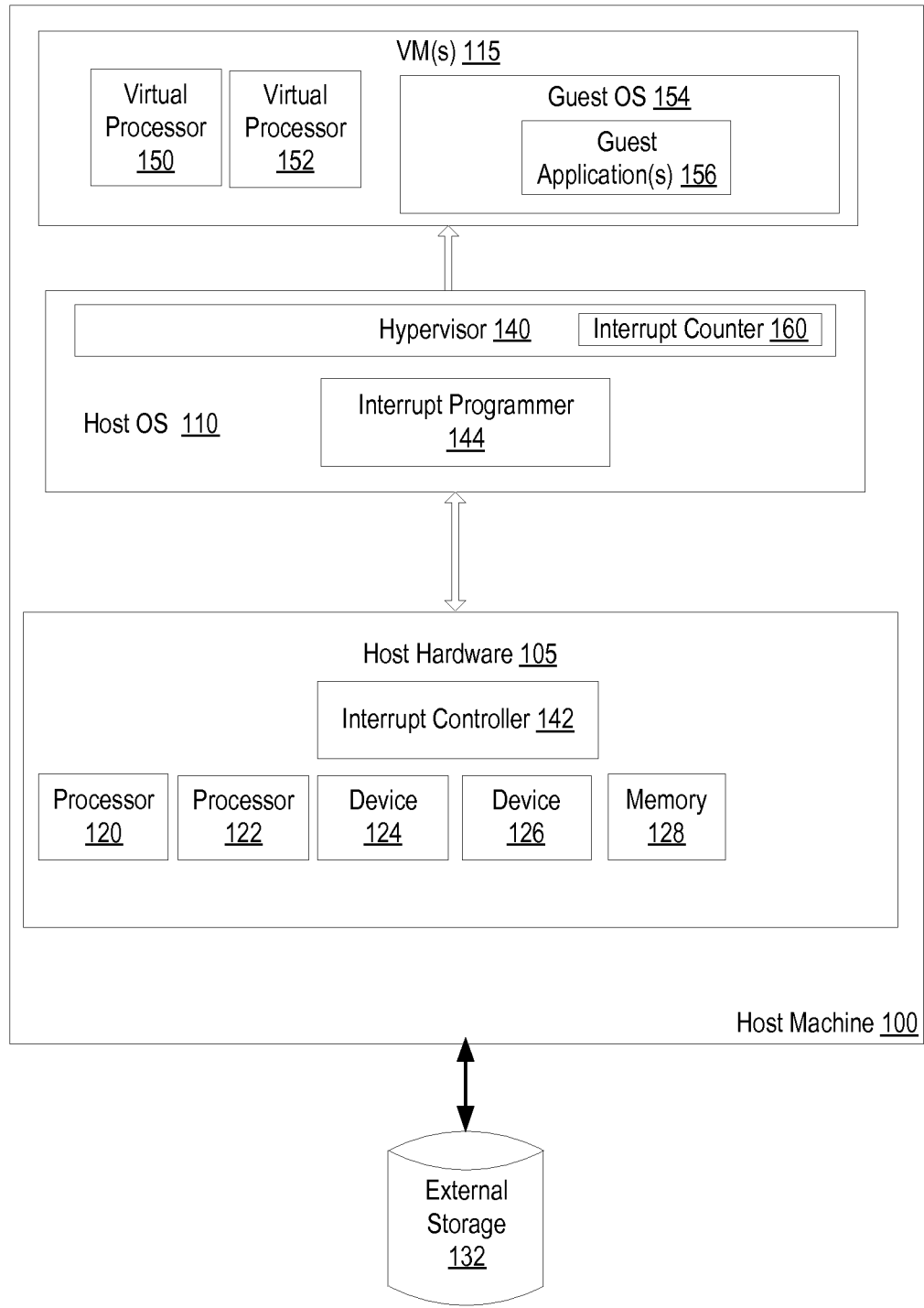
FIG. 1 is a block diagram illustrating an example of a computer system that hosts one or more virtual machines.

Disclosed herein are systems, methods, and computer program products for providing fast interrupt register access in hypervisors.

In an example, a virtual machine may simulate interrupt processing and interrupt controller functionality of a physical computer system. For example, the virtual machine may provide software emulation of registers associated with a physical interrupt controller of a specific computing platform (e.g., an advanced programmable interrupt controller (APIC) of the x86 architecture). The virtual machine also may provide a set of interrupt vectors that each correspond to an architecturally-defined platform exception (e.g., a fault, a trap, an abort, etc.). Further, the registers provided by the virtual machine may include a set of bits that each represent an interrupt vector of the platform.

For example, an Interrupt Request Register (IRR) and/or an In-Service Register (ISR) on the APIC platform each may include a stream of 256 bits. Further, each of the bits may represent an assertable interrupt vector provided by the APIC platform. In one example, an asserted interrupt may be handled by first setting a corresponding IRR interrupt vector bit. The set IRR interrupt vector bit then may be cleared and a corresponding ISR interrupt vector bit may be set when the asserted interrupt is processed by the virtual machine.

Determining whether an interrupt vector has been set typically requires scanning every register of a virtual machine. However, the scanning is often unnecessary because interrupt vectors are not usually set. Therefore, it is advantageous to have a location where set interrupt vectors are tracked for quick reference. The location can be examined efficiently to avoid scanning a set of registers, thus resulting in improved performance.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 is a block diagram that illustrates an example of a computer system (referred to herein as a host machine 100) that hosts one or more virtual machines (VMs) 115. The host machine 100 may be a rackmount server, a workstation, a desktop computer, a notebook computer, a tablet computer, a mobile phone, a palm-sized computing device, a personal digital assistant (PDA), etc.

The host machine 100 includes host hardware 105, which includes multiple processors 120, 122, multiple devices 124, 126, memory 128, and other hardware components. The memory 124 may include volatile memory devices (e.g., random access memory (RAM)), non-volatile memory devices (e.g., flash memory), and/or other types of memory devices. The host hardware 105 also may be coupled to external storage 132 via a direct connection or a local network. The host machine 100 may be a single machine or multiple host machines arranged in a cluster.

The term "processor," as used herein, refers to a single processor core. Each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 120, 122 that are processor cores of the same integrated circuit share a socket. Processors that share a socket may communicate with one another more efficiently than processors that do not share a socket.

Each of the devices 124, 126 may be a physical device that is internal or external to the host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc. Devices 124, 126 communicate with the host machine (e.g., notify the host machine 100 of events) by generating device interrupts.

In one example, devices 124, 126 send device interrupts to an interrupt controller 142 (e.g., an advanced programmable interrupt controller (APIC)) on the host machine 100 via a physical interrupt line. The interrupt controller 142 is a device that is a component of the host hardware 105. The interrupt controller 142 receives interrupts and determines which processors 120, 122 should handle the interrupts. The interrupt controller 142 then sends the device interrupts to the determined processors. For example, interrupt controller 142 may receive an interrupt from device 124 and send the interrupt to processor 120.

In another example, devices 124, 126 generate message signaled interrupts (MSIs). A message signaled interrupt does not use a physical interrupt line. Instead, the device 124, 126 sends the device interrupt in-band over some communications medium, such as a computer bus. Message signaled interrupts designate a processor to handle the interrupt. Some devices 124, 126 may send MSIs, while other devices 124, 126 may generate standard or legacy device interrupts. Further, a single device may support generating both MSIs and standard device interrupts, though not generally at the same time.

The host machine 100 includes a hypervisor 140 (also known as a virtual machine monitor (VMM)). In one example (as shown), the hypervisor 140 is a component of a host operating system 110. Alternatively, the hypervisor 140 may run on top of a host OS 110, or may run directly on host hardware 105 without the use of a host OS 110.

The hypervisor 140 manages system resources, including access to memory 128, devices 124, 126, secondary storage, and so on. The hypervisor 140, though typically implemented in software, may emulate and export a bare machine interface (host hardware 105) to higher-level software. Such higher-level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 115, which may provide the same or different abstractions to various guest software (e.g., guest operating system, guest applications, etc.).

The hypervisor 140 includes an interrupt counter 160 to track when interrupt vectors are set in a virtual machine (VM) 115. In an example, the interrupt counter 160 is provided directly in the memory of the hypervisor 140 (e.g., in physical memory that is assigned to and utilized by the hypervisor 140). Thus, the hypervisor 140 may directly access the interrupt counter 160 to quickly determine whether an interrupt vector is set, instead of scanning a series of registers in the VM 115.

Interrupt counter 160 may track whether interrupt vectors are set for a single register or a plurality of registers in a virtual machine (VM) 115. Further, interrupt counter 160 may be used by the hypervisor 140 during interrupt handling and/or other processing to determine whether interrupt vectors are set for one or more registers of a virtual machine.

The hypervisor 140 may examine the interrupt counter 160 before or instead of performing a full scan of a plurality of registers (e.g., an entire set of registers) to determine whether an interrupt vector is set in a virtual machine (VM) 115. Such information may help the hypervisor 140 to first determine whether scanning a set of interrupt registers is to be performed or can be avoided.

In some examples, use of an interrupt counter 160 helps the hypervisor 140 to avoid scanning a set of registers. For example, scanning a set of interrupt registers may be avoided when a new interrupt has been asserted and the interrupt counter 160 indicates that no corresponding interrupt vector has been set in a virtual machine (VM) 115.

In one example, the interrupt counter 160 may provide the hypervisor 140 with a total count of interrupt vectors that are set in a virtual machine (VM) 115. For example, a virtual machine (VM) 115 emulating an x86 central processing unit (CPU) architecture may provide a total of 256 interrupt vectors. Thus, an interrupt counter 160 used to track a set interrupt vectors in this example could range anywhere from a value of 0 (no interrupt vector is set) to 256 (each interrupt vector is set).

In an example, an interrupt counter 160 may be implemented as a single numeric counter (e.g., bit, integer, etc.) to indicate a total count of set interrupt vectors in a specific virtual machine (VM) 115. In another example, an interrupt counter 160 may be implemented as a plurality of numeric counters (e.g., bits, integers, etc.) where each counter is associated with a specific register in a specific virtual machine (VM) 115. For example, an interrupt counter 160 may be implemented using a vector, a list, an array, an object, and/or any other data type, data structure or combination thereof to indicate set interrupt vectors for a specific register of a specific virtual machine (VM) 115.

In an example, the hypervisor 140 provides and maintains different interrupt counters 160 that are each specific to different virtual machines (VM) 115. For example, the hypervisor 140 may provide and maintain an interrupt counter 160 (or a set of interrupt counters 160) specific to a first virtual machine. The hypervisor 140 also may provide and maintain a different interrupt counter 160 (or a different set of interrupt counters 160) specific to a second virtual machine. Thus, the hypervisor 140 may include a plurality of interrupt counters 160 from one or more virtual machines (VMs) 115.

In one example, the hypervisor 140 may initialize the interrupt counter 160 for a virtual machine (VM) 115. During the initialization, the hypervisor 140 may, for example, set the interrupt counter 160 to a value such as zero ("0"), "empty", NULL, etc. The hypervisor 140 also may clear or reset interrupt vectors that are set in the virtual machine (VM) 115 as part of the initialization process. Further, the hypervisor 140 may initialize the interrupt counter 160 at any time during processing.

The host machine 100 hosts any number of virtual machines (VM) 115 (e.g., a single VM, one hundred VMs, etc.). A virtual machine 115 is a combination of guest software that uses an underlying emulation of the host machine 100 (e.g., as provided by the hypervisor 140). The guest software may include a guest operating system 154, guest applications 156, guest device drivers (not shown), etc. Virtual machines 115 can be, for example, hardware emulation, full virtualization, para-virtualization, and operating system-level virtualization virtual machines. The virtual machines 115 may have the same or different guest operating systems 154, such as Microsoft® Windows®, Linux®, Solaris®, etc.

Each VM 115 may include multiple virtual processors 150, 152. Each virtual processor 150, 152 of a VM 115 executes on a specific processor 120, 122 of the host machine 100. The hypervisor 140 may control which virtual processors 150, 152 run on which hardware processors 120, 122. For example, virtual processor 150 may run on processor 120, and virtual processor 152 may run on processor 122.

The host OS 110 may assign specific processors 120, 122 to handle interrupts for specific devices 124, 126. Additionally, the guest OS 154 of the VM 115 may assign specific virtual processors 150, 152 to handle interrupts for specific devices 124, 126. Moreover, the hypervisor 140 assigns each virtual processor 150, 152 to run on a specific hardware processor 120, 122.

In one example, the host machine assigns processor 120 to handle device interrupts for device 124, the hypervisor 140 assigns virtual processor 152 to run on processor 122, and the guest assigns virtual processor 152 to handle device interrupts for the device 124. Therefore, the virtual processor that the guest has assigned to handle device interrupts for a specific device may run on a different physical processor than was assigned to handle device interrupts for the device.

In this scenario, processor 120 would receive an interrupt for device 124. Processor 120 would then determine that virtual processor 152 is assigned to control the device and that virtual processor 152 runs on processor 122. Processor 120 would generate an inter-processor interrupt (IPI) to forward the device interrupt for device 124 to processor 122 so that virtual processor 152 running on processor 122 can act on the device interrupt.

In one example, interrupt programmer 144 programs a device 124, 126 and/or the interrupt controller 142 to cause the device 124, 126 and/or interrupt controller 142 to send device interrupts to a specified processor 120, 122. The specified processor 120, 122 may be the processor on which a virtual processor 150, 152 that handles device interrupts for that particular device 124, 126 executes. Since the overhead of communication regarding a device interrupt for a device is often greater than the overhead of actually processing the device interrupt, collocating the processing of the interrupt to a processor 120, 122 that hosts a virtual processor 150, 152 that controls the device 124, 126 can result in significant efficiency gains.

The interrupt programmer 144 may program the device 124, 126 and/or interrupt controller 142 in response to one or more update criteria. In one example, the interrupt programmer 144 keeps track of a number of IPIs that have been generated based on device interrupts for each device 124, 126. When a threshold number of IPIs have been generated based on device interrupts for a particular device 124, 126, that device and/or the interrupt controller 142 may be updated to send future device interrupts to a different processor.

In another example, the interrupt programmer 144 maintains a list (or other data structure) of devices that are controlled by each virtual processor 150, 152. When the hypervisor 140 moves a virtual processor 150, 152 to a new hardware processor 120, 122, then the interrupt programmer 144 may update the devices that are controlled by that virtual processor so that the devices will send MSIs to the new hardware processor 120, 122. Additionally, or in the alternative, the interrupt programmer 144 may update the interrupt controller 142 to send interrupts for those devices 124, 126 to the new hardware processor 120, 122.

Figure 2:
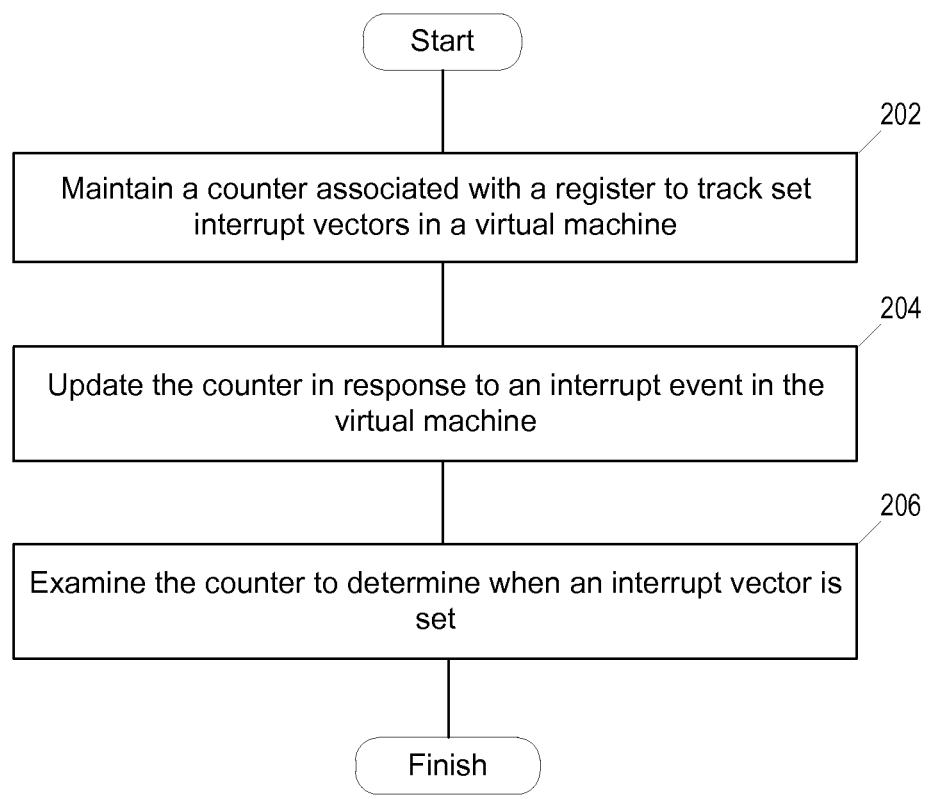
FIG. 2 is a flow diagram illustrating an example of a method for providing fast interrupt register access in a hypervisor.

FIG. 2 is a flow diagram illustrating an example of a method 200 for providing fast interrupt register access in a hypervisor using a counter. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 200 is performed by the hypervisor 140 of FIG. 1.

At block 202, a counter associated with a register is maintained to track set interrupt vectors in a virtual machine (VM) 115. In an example, an interrupt counter 160 is associated with a virtual machine (VM) 115. The interrupt counter 160 is located in memory of the hypervisor 140 and, for example, may not be accessible from the virtual machine (VM) 115. Further, the hypervisor 140 may have a plurality of interrupt counters, associated with one or more virtual machines (VMs) 115.

In an example, the hypervisor 140 maintains an interrupt counter 160 for a virtual machine (VM) 115. Interrupt counter 160 may be used to track set interrupt vectors in the virtual machine (VM) 115. For example, the interrupt counter 160 may be used to indicate a count of set interrupt vectors for one or more interrupt registers in the virtual machine (VM) 115.

At block 204, the hypervisor 140 updates the counter in response to an interrupt event in the virtual machine. In an example, the hypervisor 140 increments the interrupt counter 160 in response to an asserted interrupt that is received. In another example, the interrupt counter 160 is decremented based on a deasserted interrupt that is received.

Interrupt assertion generally describes the process of initiating an interrupt in a computer system. For example, an interrupt may be asserted when a hardware interrupt or a software interrupt is generated.

Interrupt deassertion generally describes the process of signaling an end of interrupt for an interrupt that was previously asserted. Interrupt deassertion may occur, for example, when a virtual machine (VM) 115 has finished handling a previously asserted interrupt or seeks to clear a pending interrupt that is no longer needed.

At block 206, the hypervisor 140 examines the counter 160 to determine whether an interrupt vector is set. In an example, the hypervisor 140 receives a request to perform an operation and examines interrupt counter 160 to determine whether a scan of one or more interrupt registers is necessary or can be avoided.

For example, the hypervisor 140 may seek to determine whether an interrupt vector is set for an interrupt register in a virtual machine (VM) 115. The hypervisor 140 may then examine an interrupt counter 160 for the virtual machine (VM) 115. When the interrupt counter 160 is zero then the hypervisor 140 is aware that no interrupts are set in the virtual machine. On the other hand, when the interrupt counter 160 is greater than zero then the hypervisor 140 is aware that an interrupt register associated with the interrupt counter 160 has an interrupt vector that is set and that further processing may be necessary.

In one example, the hypervisor 140 receives a request to assert or deassert an interrupt associated with an interrupt register in a virtual machine (VM) 115. The virtual machine (VM) 115 may receive the request, for example, when simulating interrupt handling. In another example, the hypervisor 140 may need to determine whether an interrupt has been asserted for any number of higher priority interrupt registers in a virtual machine (VM) 115.

Figure 3:
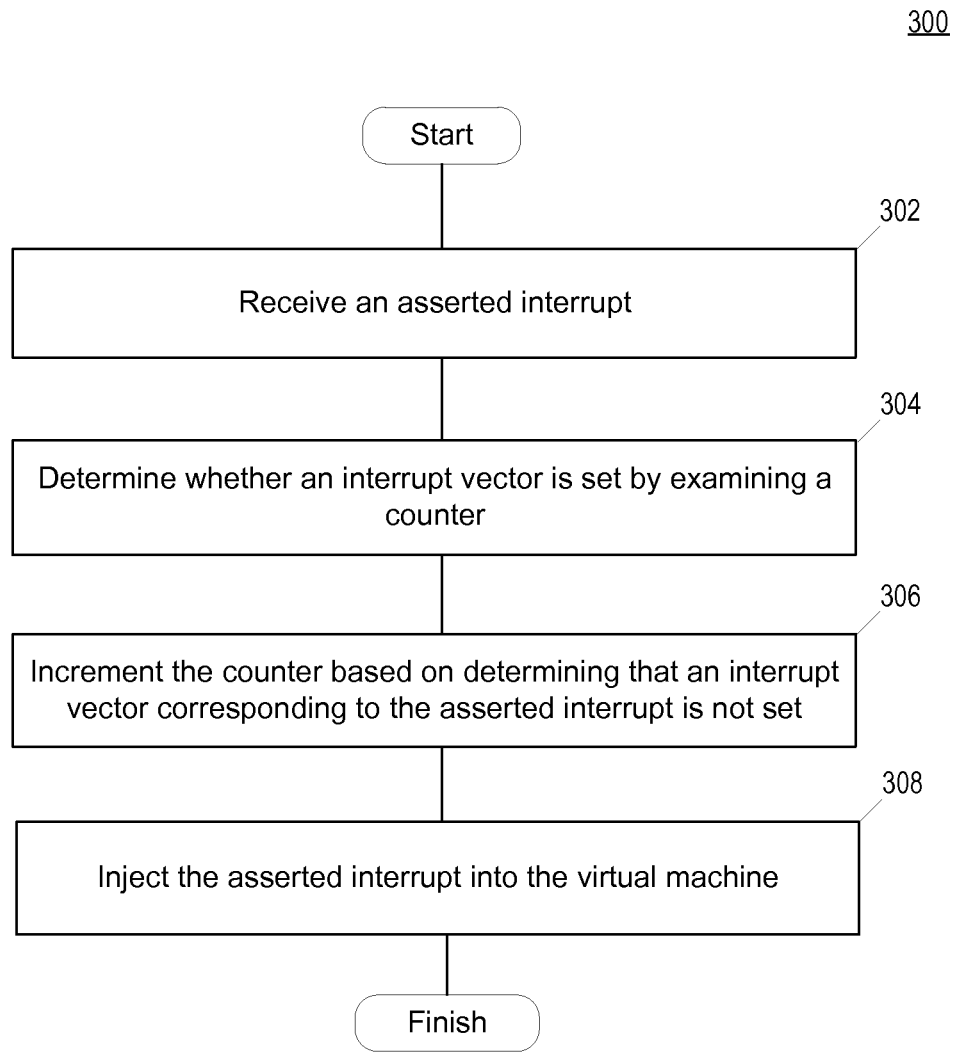
FIG. 3 is a flow diagram illustrating an example of a method for providing fast interrupt register access in a hypervisor for an asserted interrupt.

FIG. 3 is a flow diagram illustrating an example of a method for providing fast interrupt register access in a hypervisor for an asserted interrupt. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 300 is performed by the hypervisor 140 of FIG. 1.

At block 302 the hypervisor 140 receives an asserted interrupt associated with a register in a virtual machine (VM) 115. In an example, the hypervisor 140 seeks to determine whether the asserted interrupt can be injected into the virtual machine (VM) 115. For example, when no interrupt vector is set for the register associated with the asserted interrupt, the hypervisor 140 may inject a corresponding interrupt into the virtual machine (VM) 115. On the other hand, when an interrupt vector is set in a register associated with the asserted interrupt, the hypervisor 140 may need to queue the asserted interrupt or take other action(s). In one example, a first physical CPU is used to assert the interrupt.

At block 304, the hypervisor 140 determines whether an interrupt vector is set by examining a counter. In an example, the hypervisor 140 examines the interrupt counter 160. When the interrupt counter 160 is zero then the hypervisor 140 may determine that no interrupt vector is set for interrupt registers associated with the interrupt counter 160. On the other hand, when the interrupt counter 160 is greater than zero then, for example, the hypervisor 140 may further investigate which specific interrupt(s) is/are pending in the virtual machine (VM) 115. In one example, the hypervisor 140 performs block 304 using a second physical CPU that is different from the first physical CPU used to assert the interrupt in block 302.

At block 306, the hypervisor 140 increments the counter based on determining that an interrupt vector corresponding to the asserted interrupt is not set. In an example, the hypervisor 140 determines that an interrupt vector is not set based on examining the interrupt counter 160. The hypervisor 140 may determine that an interrupt vector is not set for the interrupt register corresponding to the asserted interrupt when, for example, the interrupt counter 160 is set to zero. Thus, the hypervisor 140 may use the interrupt counter 160 instead of scanning numerous interrupt registers in the virtual machine (VM) 115.

The incrementing may be performed, for example, before or after a corresponding interrupt is injected into the virtual machine (VM) 115. In one example, the hypervisor 140 increments the interrupt counter 160 before examining the counter and before injecting the interrupt. In another example, the hypervisor 140 performs block 306 using a second physical CPU that is different from the first physical CPU used to assert the interrupt in block 302.

At block 308, the hypervisor 140 injects the asserted interrupt into the virtual machine (VM) 115. In an example, the hypervisor 140 injects the asserted interrupt into the virtual machine (VM) 115 based on determining that a corresponding interrupt vector is not set for a register (e.g., an interrupt register). In one example, the hypervisor 140 performs block 308 using a second physical CPU that is different from the first physical CPU used to assert the interrupt in block 302.

In one example, the hypervisor 140 may perform some or all of the blocks in method 300 as an atomic operation. Atomic operations generally prevent other processes and/or devices from reading from and/or writing to memory until an entire operation is complete.

An atomic operation may, for example, combine multiple procedures into a single instruction or may use a lock prefix to prevent other processors from interfering during certain operations. Atomic operations may be required, for example, when different processors are used to (1) assert an interrupt and (2) deliver the asserted interrupt to a virtual machine.

In one example, the hypervisor 140 may perform the receiving of an asserted interrupt, the examining of the interrupt counter 160, the incrementing of the interrupt counter 160, and the injecting of an interrupt as a single atomic operation. The hypervisor 140 also may perform any combination of the blocks in method 300 as an atomic operation. In addition, any block in method 300, such as the incrementing of the interrupt counter 160, may be performed individually as an atomic operation. Further, any of the blocks in method 300 may be combined with any number of other activities as part of a single atomic operation.

Figure 4:
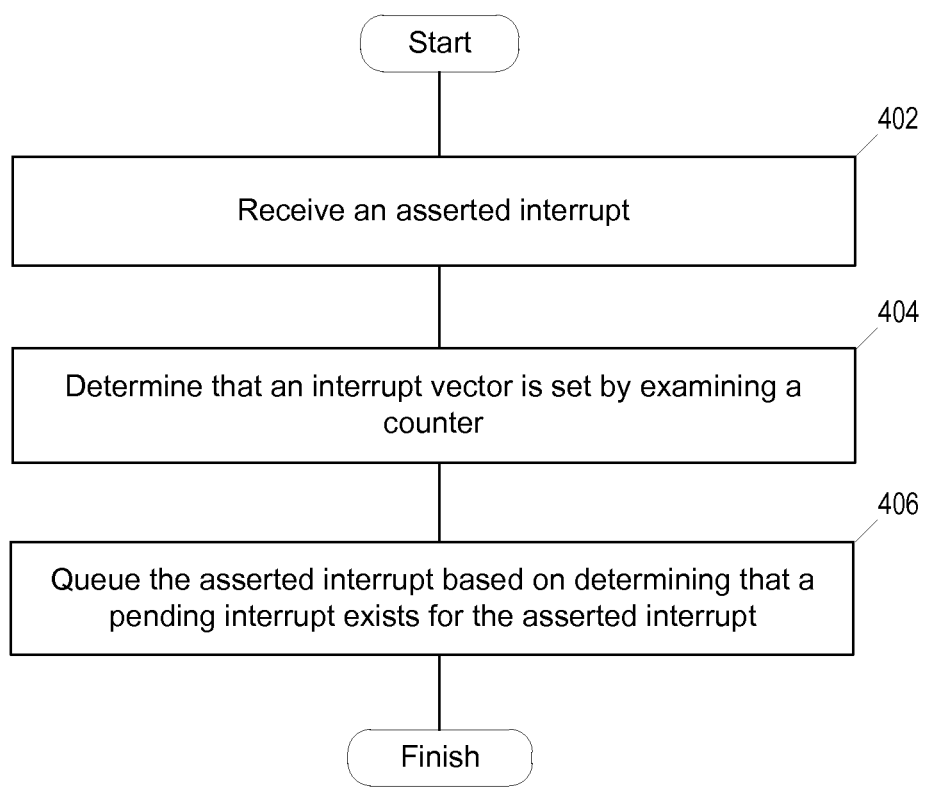
FIG. 4 is a flow diagram illustrating an example of a method for providing fast interrupt register access in a hypervisor for an asserted interrupt when a corresponding interrupt vector is already set.

FIG. 4 is a flow diagram illustrating an example of a method for providing fast interrupt register access in a hypervisor for an asserted interrupt when a corresponding interrupt vector is already set. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 400 is performed by the hypervisor 140 of FIG. 1.

At block 402, the hypervisor 140 receives an asserted interrupt associated with a register of the virtual machine (VM) 115. In one example, a first physical CPU is used to assert the interrupt.

At block 404, the hypervisor 140 determines that an interrupt vector is set by examining a counter. In an example, the hypervisor 140 examines the interrupt counter 160 to determine that an interrupt is pending in the virtual machine (VM) 115. The hypervisor 140 may then perform further examination of the interrupt registers in the virtual machine (VM) 115 and determine that an interrupt vector is set for the asserted interrupt received in block 402. In one example, the hypervisor 140 performs block 404 using a second physical CPU that is different from the first physical CPU used to assert the interrupt in block 402.

At block 406, the hypervisor 140 queues the asserted interrupt based on determining that an interrupt vector is already set for the asserted interrupt. In an example, the hypervisor 140 may periodically check the interrupt counter 160 to determine whether a set interrupt vector has been cleared. Further, the hypervisor 140 may de-queue and process the asserted interrupt once the pending interrupt has been cleared. In one example, the hypervisor 140 performs block 406 using a second physical CPU that is different from the first physical CPU used to assert the interrupt in block 402.

Figure 5:
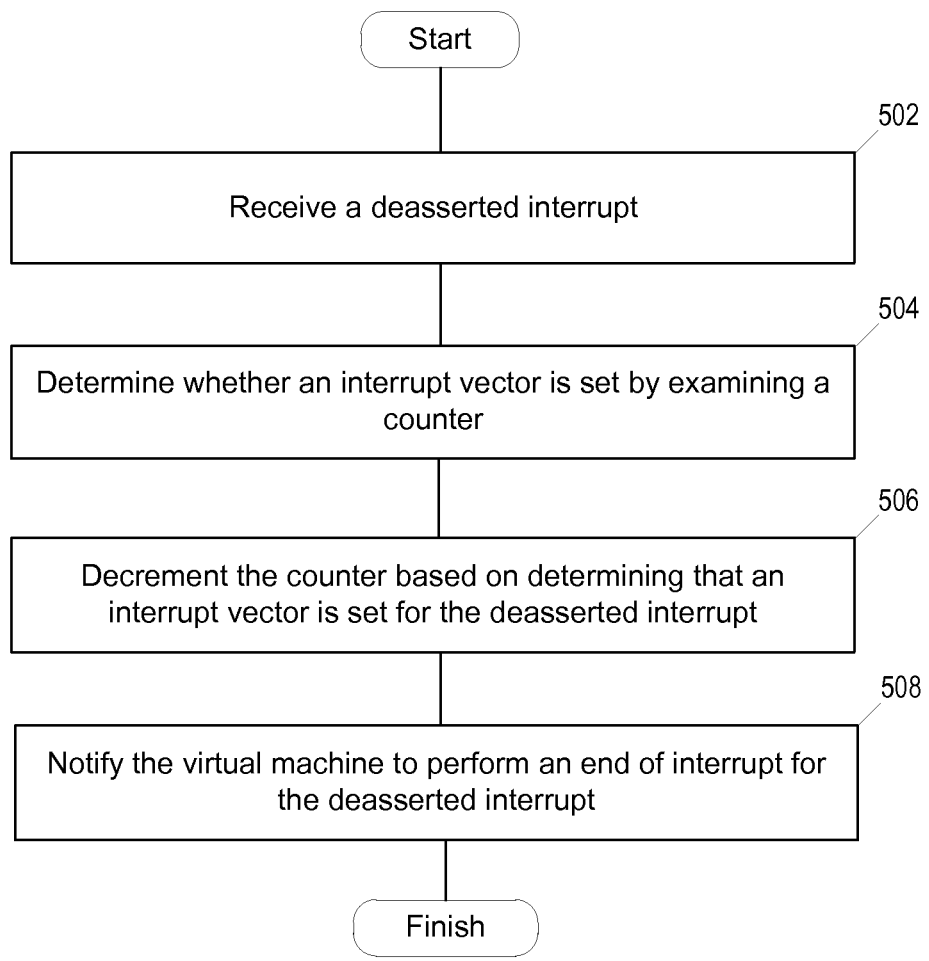
FIG. 5 is a flow diagram illustrating an example of a method for providing fast interrupt register access in a hypervisor for a deasserted interrupt.

FIG. 5 is a flow diagram illustrating an example of a method for providing fast interrupt register access in a hypervisor for a deasserted interrupt. The method 500 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 500 is performed by the hypervisor 140 of FIG. 1.

At block 502, the hypervisor 140 receives a deasserted interrupt associated with a register of the virtual machine. In one example, a first physical CPU is used to deassert the interrupt.

At block 504, the hypervisor 140 determines whether an interrupt vector is set by examining a counter. In one example, the hypervisor 140 first examines an interrupt counter 160 that tracks set interrupt vectors in a virtual machine (VM) 115. The hypervisor 140 may determine that a value of the interrupt counter 160 is zero (i.e., no interrupt vector is set). As a result, the hypervisor 140 can avoid scanning a set of registers associated with the virtual machine (VM) 115. Further, the hypervisor 140 does not decrement the interrupt counter 160 and does not notify the virtual machine (VM) 115 about performing an end of interrupt for the deasserted interrupt received in block 502, based on the determination.

In another example, the hypervisor 140 examines the interrupt counter 160 and determines that the value of the counter is greater than zero. Based on the determination, the hypervisor 140 may further investigate which specific interrupt(s) may be pending in the virtual machine (VM) 115. In one example, the hypervisor 140 performs block 504 using a second physical CPU that is different from the first physical CPU used to deassert the interrupt in block 502.

At block 506, the hypervisor 140 decrements the counter based on determining that an interrupt vector is set for the deasserted interrupt. The decrementing may be performed, for example, before or after the virtual machine (VM) 115 is notified to perform an "end of interrupt" for the deasserted interrupt received in block 502. In one example, the hypervisor 140 decrements the interrupt counter 160 before examining the counter and before notifying the virtual machine. In another example, the hypervisor 140 performs block 506 using a second physical CPU that is different from the first physical CPU used to deassert the interrupt in block 502.

At block 508, the hypervisor 140 notifies the virtual machine to perform an end of interrupt for the pending interrupt associated with the interrupt register of the deasserted interrupt. In an example, the hypervisor also may clear corresponding interrupt vector bits in one or more interrupt counters 160. In one example, the hypervisor 140 performs block 508 using a second physical CPU that is different from the first physical CPU used to deassert the interrupt in block 502.

In one example, the hypervisor 140 may perform some or all of the blocks in method 500 as an atomic operation to prevent other processes and/or devices from reading from and/or writing to memory until the operation is complete. An atomic operation may, for example, combine multiple procedures into a single instruction or may use a lock prefix to prevent other processors from interfering during certain operations.

In one example, the hypervisor 140 may perform the receiving of a deasserted interrupt, the examining of the interrupt counter 160, the decrementing of the interrupt counter 160, and the corresponding notifying as a single atomic operation. The hypervisor 140 also may perform any combination of the blocks in method 500 as an atomic operation. In addition, any block in method 500, such as the decrementing of the interrupt counter 160, may be performed individually as an atomic operation. Further, any of the blocks in method 500 may be combined with any number of other activities as part of a single atomic operation.

Figure 6:
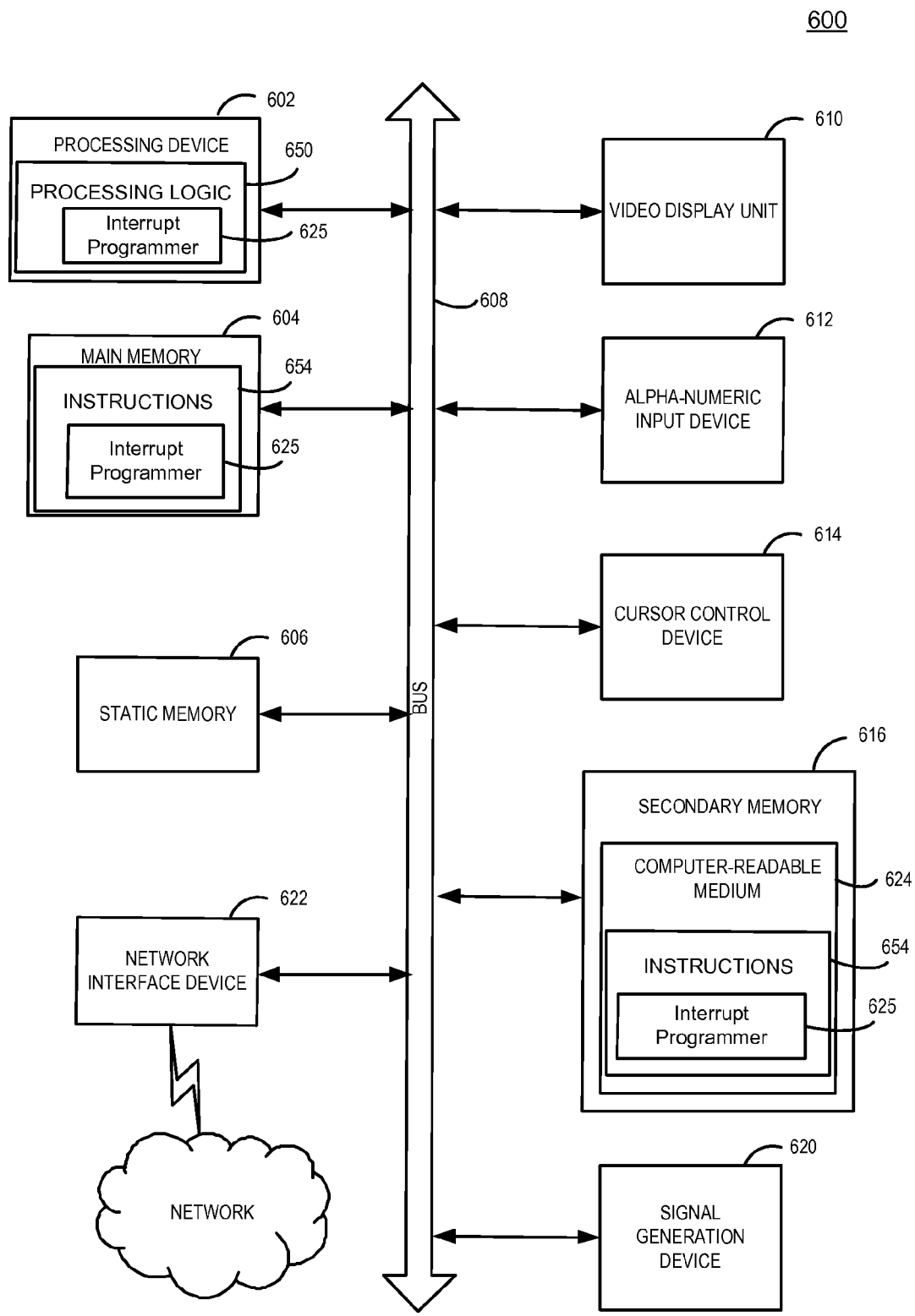
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to host machine 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processing devices such as a microprocessor, central processing unit, or the like. The processing device may include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., interrupt programmer 625). The instructions 654 may also reside, completely or at least partially, within the main memory 604 and/or within the processing device 602 during execution thereof by the computer system 600 (where the main memory 604 and the processing device 602 constituting machine-readable storage media).

While the computer-readable storage medium 624 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 600 may additionally include an interrupt programming module (not shown) for implementing the functionalities of the interrupt programmer. The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    maintaining, in memory of a hypervisor executed by a processing device, a counter associated with an interrupt register to track a pending interrupt in a virtual machine;
    updating, by the processing device executing the hypervisor, the counter in response to an interrupt event in the virtual machine;
    examining, by the processing device executing the hypervisor, the counter to determine whether the pending interrupt exists in the virtual machine;
    receiving, by the processing device executing the hypervisor, an asserted interrupt associated with the interrupt register;
    incrementing, by the processing device executing the hypervisor, the counter in view of determining that no pending interrupt exists for the interrupt register; and
    injecting, by the processing device executing the hypervisor, the asserted interrupt into the virtual machine in response to determining that no pending interrupt exists for the interrupt register.

2. The method of claim 1, wherein the incrementing is performed prior to the injecting.

3. The method of claim 1, further comprising:
    queuing, by the processing device executing the hypervisor, the asserted interrupt in response to determining that a pending interrupt exists for the interrupt register.

4. The method of claim 1, further comprising:
    receiving, by the processing device executing the hypervisor, a deasserted interrupt associated with the interrupt register; and
    decrementing, by the hypervisor, the counter in view of determining that a pending interrupt exists for the interrupt register.

5. The method of claim 4, further comprising:
    notifying, by the processing device executing the hypervisor, the virtual machine to perform an end of interrupt for the deasserted interrupt in view of determining that a pending interrupt exists for the interrupt register.

6. The method of claim 5, wherein the decrementing is performed prior to both the examining and the notifying.

7. The method of claim 1, further comprising:
    initializing the counter by:
        setting the counter to zero; and
        clearing all pending interrupts in the virtual machine.

8. The method of claim 1, wherein the examining, the receiving, and the incrementing are performed as an atomic operation.

9. The method of claim 4, wherein the examining, the receiving, and the decrementing are performed as an atomic operation.

10. The method of claim 1, wherein the virtual machine provides an emulation of an advanced programmable interrupt controller (APIC) architecture in a simulated x86 environment.

11. A non-transitory computer-readable storage medium having instructions recorded thereon that, when executed by a processing device, cause the processing device to:
    maintain, in memory of a hypervisor executed by a processing device, a counter associated with an interrupt register to track a pending interrupt in a virtual machine;
    update, by the hypervisor, the counter in response to an interrupt event in the virtual machine;
    examine, by the processing device executing the hypervisor, the counter to determine whether the pending interrupt exists in the virtual machine;
    receive an asserted interrupt associated with the interrupt register;

increment, by the hypervisor, the counter in view of determining that no pending interrupt exists for the interrupt register; and inject, by the processing device executing the hypervisor, the asserted interrupt into the virtual machine in response to determining that no pending interrupt exists for the interrupt register.

12. The non-transitory computer-readable storage medium of claim 11, wherein the processing device further to:
receive a deasserted interrupt associated with the interrupt register; and
decrement, by the hypervisor, the counter in view of determining that a pending interrupt exists for the interrupt register.

13. The non-transitory computer-readable storage medium of claim 12, wherein the processing device further to notify, by the hypervisor, the virtual machine to perform an end of interrupt for the deasserted interrupt in view of determining that a pending interrupt exists for the interrupt register.

14. A system, comprising:
a memory;
a processing device; and
a hypervisor having access to the memory and executed by the processing device, wherein the processing device to execute the hypervisor to:
maintain, in the memory, a counter associated with an interrupt register to track a pending interrupt in a virtual machine;
update the counter in response to an interrupt event in the virtual machine;
examine the counter to determine whether the pending interrupt exists in the virtual machine;
receive an asserted interrupt associated with the interrupt register;
increment the counter in view of determining that no pending interrupt exists for the interrupt register; and
inject the asserted interrupt into the virtual machine in view of determining that no pending interrupt exists for the interrupt register.

15. The system of claim 14, wherein the processing device to execute the hypervisor further to:
receive a deasserted interrupt associated with the interrupt register;
decrement the counter in view of determining that a pending interrupt exists for the interrupt register; and
notify the virtual machine to perform an end of interrupt for the deasserted interrupt based on determining that a pending interrupt exists for the interrupt register.

16. The non-transitory computer-readable storage medium of claim 11, wherein the processing device further to increment the counter before the hypervisor injects the asserted interrupt into the virtual machine.

17. The system of claim 14, wherein the processing device to execute the hypervisor further to increment the counter before the hypervisor injects the asserted interrupt into the virtual machine.

* * * * *